United States Patent Office 2,715,140
Patented Aug. 9, 1955

2,715,140

REGENERATION OF VINYL ACETATE CATALYST

William H. Vining, Niagara Falls, N. Y., assignor to E. I. du Pont de Nemours and Company, Wilmington Del., a corporation of Delaware No Drawing. Application December 12, 1952, Serial No. 325,701

3 Claims. (Cl. 260—498)

This invention relates to the regeneration of catalyst which has lost its activity in the process of manufacturing vinyl acetate from the vapors of acetic acid and acetylene by contact with active charcoal impregnated with zinc acetate.

Catalysts used in the reaction of acetic acid and acetylene gradually lose their effectiveness and must be replaced when their activity falls below a level at which the process becomes uneconomic to operate. Since the catalyst is expensive a reactivation of the spent catalyst to its former activity is needed. On a large scale operation the catalyst is usually gradually replaced with fresh catalyst although it is also possible to interrupt operation and make a complete replacement at one time.

The main object of this invention is to provide a method for reactivating spent catalyst of the active charcoal zinc acetate impregnated type. Another object is the removal of impurities such as organic condensation products from spent catalyst. A further object is to increase the activity of spent catalyst above that of the original catalyst. Other objects will be apparent as the invention is further described.

To accomplish these objectives I have discovered that a catalyst consisting of zinc acetate supported on active carbon which has lost its activity can be reactivated by treatment with superheated steam to achieve a catalytic activity at least as good as the original activity and even higher. Regeneration takes place because the steam treatment at elevated temperatures removes the tarry or carbonaceous reaction side products by converting them into volatilizable materials. The zinc acetate is converted to oxide or hydroxide by this steam treatment. After the steam treatment the zinc can again be converted to the acetate by treatment with acetic acid at lower temperatures.

The degree of regeneration of spent catalyst depends on the temperature of the steam and the length of time the steam contacts the catalyst.

EXAMPLE 1

2290 grams of used catalyst of approximately 30–150 mesh, having a density of 763 grams per liter was treated with steam superheated to 700° C. for a period of 2 hours using the fluidized solids technique. 1645 grams of material was recovered which had a density of 577 grams per liter and contained 9.3% of zinc. This was treated with acetic acid solution and then dried. The final regenerated catalyst contained 7.3% of zinc and had a density of 650 grams per liter. This catalyst when used in the vinyl acetate reactor, gave an initial conversion of 60% of acetic acid feed to vinyl acetate and 48.5% after 100 hours of operation. Reactor feed consisted of 11 ml. of liquid acetic acid per minute vaporized into 20 liters per minute of acetylene. Reactor temperature was maintained at 210° C. throughout the run. New catalyst under the same conditions gives an initial conversion of 70 to 75% and 45 to 50% after 100 hours.

EXAMPLE 2

2284 grams of used catalyst having a density of 761 grams per liter was treated with steam superheated to 755° C. for 2 hours. 1536 grams of material was recovered. Its density was 554 grams per liter and it contained 10.4% of zinc. After treatment with aqueous acetic acid and drying, the zinc content of the final regenerated catalyst was 8.1% and its density was 600 grams per liter. This catalyst gave an initial conversion of 74% under the same conditions as in Example 1. After 100 hours, 57% conversion of acetic acid to vinyl acetate was still being obtained.

When regeneration was effected by steaming at 900° C. for several hours a catalyst was obtained having an initial conversion activity of 87% based on acetic acid. This rate dropped to 83% after 50 hours of operation. In another case where a regeneration temperature of 800° C. was applied for 12 hours the catalyst activity was 84% initially and 62% after 50 hours of operation. In these cases the steaming treatment was applied to a stationary bed spent catalyst as contrasted with the fluidized solids treatment of Examples 1 and 2.

Physical rather than chemical characteristics are probably responsible for variation in catalyst activity aside from the purely blanking effect of by-product tars and carbonaceous matters. The table following shows the results of measurements of surface area, pore volume and average pore diameter of catalyst regenerated at different temperatures and compares these with new charcoal.

*Physical measurements on regenerated catalyst and new charcoal*

| Steaming Temp., ° C. | Surface Area, m.²/g. | Pore Volume, cc./g. | Ave. Pore Diam. (A°) |
|---|---|---|---|
| 600 | 705 | 0.369 | 20.9 |
| 700 | 777 | 0.547 | 28.2 |
| 755 | 884 | 0.661 | 29.9 |
| 800 | 997 | 0.661 | 26.5 |
| 900 | 1,139 | 1.052 | 37.0 |
| new charcoal | 1,088 | 0.600 | 22.1 |

Some regeneration takes place by steaming spent catalyst at 400° C. but reactivity cannot be obtained approaching that of new catalyst. For more complete regenerating a temperature range of 650 to 750 is required. When steaming is done at about 800° up to 900° C. the regenerated catalyst often becomes more active than the original catalyst. The length of time for steaming may vary between 30 minutes and 24 hours depending upon the effectiveness of contact of superheated steam and catalyst surface.

When steam is applied to spent catalyst at temperatures up to 800° C., the loss of zinc is a minor factor but as the temperature rises above 800° C. the loss becomes increasingly greater. At 800° C. the loss of carbon, probably due to the water gas reaction is about in proportion to the loss of zinc by vaporization and the resulting catalyst will have approximately the same composition as new catalyst after conversion of the zinc oxide or hydroxide to the acetate. However, if a more active catalyst is desired a higher steam temperature can be applied and then some make-up zinc acetate must be added in the acetic acid treatment so as to obtain the desired ratio of zinc to carbon.

At temperatures up to about 775° C. zinc recoveries are better than 97% during steaming. Carbon recoveries are of the same order of magnitude.

Where particle size permits the spent catalyst can be subjected to steam treatment in a fluidized solids type of reactor. If the particle size is too large for fluidization, the steaming can be done in a stationary bed reactor.

In the latter case, I have generally found that contact in treating time must be longer because surface contact is less efficient.

To maintain high production rates in the large scale manufacture of vinyl acetate from acetic acid and acetylene by contact with a catalyst composed of active charcoal impregnated with zinc acetate, it is necessary to maintain the good catalytic activity by replacement of spent or low activity catalyst with new and high activity catalyst or preferably by regenerating spent catalyst more or less continuously to the required degree of essential catalyst activity. The degree of regeneration needed will depend upon the amount of over-all activity to be maintained in the production system.

I claim:

1. In the manufacture of vinyl acetate by reacting acetylene and acetic acid vapor in the presence of a catalyst consisting of active charcoal impregnated with zinc acetate the regeneration of said catalyst by treatment with superheated steam at a temperature between 400 to 900° C. for a sufficient time to regenerate its essential catalytic activity and thereafter treating said catalyst with acetic acid.

2. Claim 1 further characterized in that the temperature range is 650 to 850° C.

3. Claim 1 further characterized in that the time to regenerate essential catalytic activity be 30 minutes to 24 hours.

References Cited in the file of this patent
UNITED STATES PATENTS 2,587,425     Adams et al.            Feb. 26, 1952